United States Patent [19]

Heinzl et al.

[11] 4,374,531

[45] Feb. 22, 1983

[54] MULTIPLE CASTING HEAD

[75] Inventors: Alfred Heinzl; Heinz Stadler, both of Munich, Fed. Rep. of Germany

[73] Assignee: Siemens Aktiengesellschaft, Berlin & Munich, Fed. Rep. of Germany

[21] Appl. No.: 203,324

[22] Filed: Nov. 3, 1980

[30] Foreign Application Priority Data

Nov. 9, 1979 [DE] Fed. Rep. of Germany ....... 2945403

[51] Int. Cl.³ .............................................. B65B 3/14
[52] U.S. Cl. ..................................... 141/82; 141/234; 141/392; 222/482
[58] Field of Search ....................... 137/637, 861, 883; 141/11, 82, 99, 198, 234, 237, 242, 243, 244, 245, 392, 85, 90; 222/146 H, 482, 509, 510, 559, 564, 146 HE, 148; 425/147

[56] References Cited

U.S. PATENT DOCUMENTS

| | | | |
|---|---|---|---|
| 260,385 | 7/1882 | Gulden | 141/243 X |
| 3,331,539 | 7/1960 | Cofer et al. | 222/509 X |
| 3,656,517 | 4/1972 | Taylor et al. | 141/237 X |
| 4,050,890 | 9/1977 | Elliott et al. | 222/146 HE |
| 4,121,740 | 10/1978 | Gabrys | 222/146 H |
| 4,143,688 | 3/1979 | Gill et al. | 141/243 X |

Primary Examiner—Frederick R. Schmidt
Attorney, Agent, or Firm—Hill, Van Santen, Steadman, Chiara & Simpson

[57] ABSTRACT

A multiple casting head for the simultaneous casting of containers, such as electrical component housings with casting compound such as viscous resin, has a plurality of serially disposed discharge nozzles for respectively supplying casting compound to individual containers, and each discharge nozzle can be individually selectively opened and closed by a separately controlled valve for supplying selected differing amounts of casting compound to each container as needed.

7 Claims, 2 Drawing Figures

MULTIPLE CASTING HEAD

BACKGROUND OF THE INVENTION

1. Field of the Invention

The present invention relates to multiple casting heads for supplying casting compound to a number of containers, and in particular to such a multiple casting head having a plurality of outlet nozzles which are individually controllable for supplying selected differing amounts of casting compound to each container.

2. Description of the Prior Art

Devices employing multiple casting heads consisting of a housing with a supply chamber for receiving casting compound and which discharge the casting compound by means of compressed air through a plurality of outlet nozzles are known in the art. Such multiple casting heads have particular utility, for example, in the casting of electronic components with viscous casting resin. Such casting heads allow a number of such components to be simultaneously cast in a production sequence. The use of such multiple casting heads in this manner does not present problems if the required quantity of casting compound for each component is equal, however, such is not always the case. For example, relay windings each possess a very different volume, even when the windings possess the same number of turns, so that when a relay or relay coil is cast in a cap different quantities of casting compound are required for each individual relay. Previously, this difference could only be taken into account by individually casting each component or, in the case of multiple casting devices, by initially introducing an equal basic quantity of casting compound into each component container followed by individually adding the remaining necessary volume by manual operation. Either approach substantially subtracted from an efficiently organized and operated casting process.

SUMMARY OF THE INVENTION

It is an object of the present invention to provide a multiple casting head for supplying casting compound to a plurality of containers which permits differing volumes of casting compound to be supplied simultaneously to each container as needed.

It is a further object of the present invention to provide such a multiple casting head which is suitable for use with hardening casting compounds such as resins utilized to cast electronic components.

In accordance with the principles of the present invention the above object is inventively achieved in a multiple casting head having a supply chamber for receiving casting compound and a plurality of outlet nozzles through which the casting compound is expelled by compressed air and in which each discharge nozzle has associated therewith an individually controllable valve for admitting or blocking the flow of casting compound through the particular discharge nozzle. This construction of a multiple casting head allows a large number of components to be simultaneously cast and also allows different volumes to be supplied to each component. The casting process commences simultaneously for all of the components disposed beneath the discharge nozzles of the casting head, and the same quantity of casting compound is discharged per time unit from the individual discharge nozzles. The individually controllable valves, however, allow each nozzle to be closed independently of the other nozzles when the component disposed therebelow has been filled to the necessary volume. The amount of filling is established for each component by the use of known scanning devices which scan the level of casting compound in the container for the component. The scanning device then generates a signal to close the valve associated with the particular discharge nozzle, thereby stopping the flow of casting compound to that particular component only.

In a preferred embodiment of the invention, each discharge nozzle in the multiple casting head is assigned a valve tappet which is carried in the casting head and has a lower tip movable via a lever device into the upper opening of the discharge nozzle. This construction embodies a minimum of movable parts and requires only infrequent cleaning, which can be undertaken in a relatively simply fashion.

In order to achieve a good distribution of the casting compound within the supply chamber of the multiple casting head, a further embodiment of the invention has a casting compound filling opening which is essentially centered in the supply chamber and which is disposed above a distributor barrier which runs essentially parallel to the row of discharge nozzles disposed therebelow. The discharge barrier is provided with an edge which is curved upward so that the casting compound is first distributed over the entire length of the barrier and then flows uniformly across the curved edge to all of the discharge nozzles. This filling opening is disposed at the end of a casting tube which extends into the distributor barrier to approximately the center of the row of discharge nozzles. In order to achieve a further improved distribution of the casting compound, the distributor barrier can be constructed with a falling gradient, when viewed from above, from the area of the filling opening to the edges of the supply chamber which are disposed above the most remote discharge nozzles.

The housing for the multiple casting head may consist of two separable parts, with the dividing plane running through the axes of the individual valves. This results in ease of maintenance and cleaning for the multiple casting head which is particularly preferable when the casting head is to be utilized to discharge hardening casting compounds such as casting resin. The two components of the casting head housing can be held together by means of clamping jaws, in which case it is preferable for at least one of the clamping jaws to be heatable.

DESCRIPTION OF THE PREFERRED EMBODIMENTS

Figure 1:
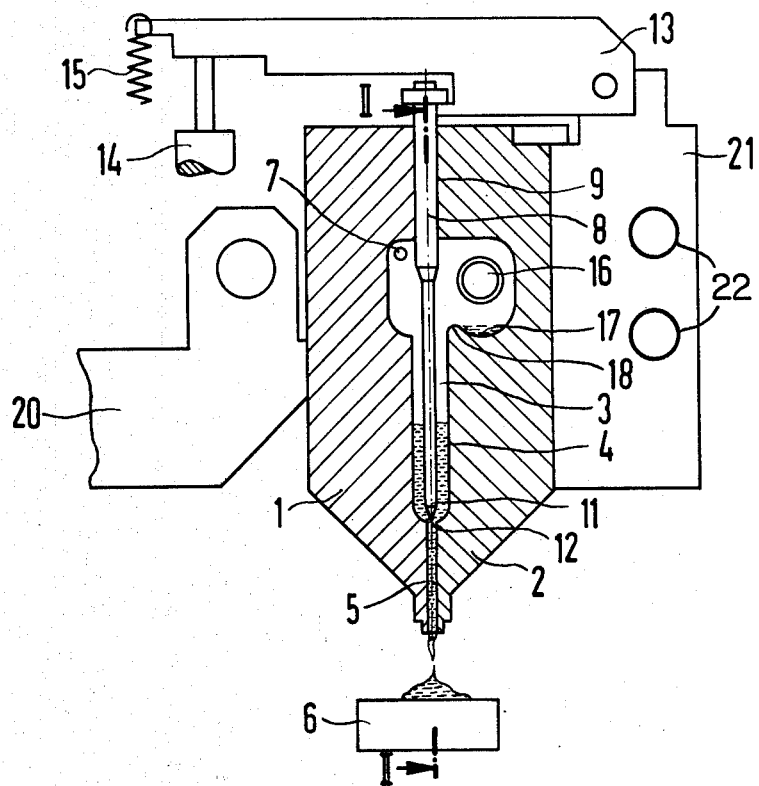
FIG. 1 is a side view, partly in section taken along line I—I of FIG. 2, of a multiple casting head with individually controllable valves for each discharge nozzle constructed in accordance with the principles of the present invention.

A multiple casting head is shown partly in section in FIG. 1 which has a housing consisting of two separable halves 1 and 2 which together enclose a feed or supply chamber 3. The feed chamber 3 contains a casting compound 4 which is discharge via a plurality of discharge nozzles 5 for supplying the casting compound 4 to a plurality of components 6. The discharge of casting compound 4 is effected by means of compressed air which is introduced into the chamber 3 through a bore 7 connected to a compressed air supply.

Each discharge nozzle 5 has a valve tappet 8 which is carried in a valve guide 9 between the two housing halves 1 and 2. The valve tappet 8 has a tip 11, which may be beveled, and is perpendicularly movable with respect to a valve seat 12. When moved a sufficient distance downward, the tip 11 completely blocks the flow of casting compound 4 through the associated discharge nozzle 5. The individual valve tappets 8 are separately actuated via an associated trigger lever 13. The trigger lever 13 is moved against a bias spring 15, normally maintaining the associated discharge nozzle 5 in a blocked state, by a lifting cylinder 14.

When a component 6 has been filled with casting compound up to a pre-determined level, a scanning device (not shown) of any type known to those skilled in the art, produces a signal which actuates the lifting cylinder 14 to lower the trigger lever 13 and thus to also lower the associated valve tappet 8. The casting process is thus concluded for the particular component 6 disposed beneath the associated nozzle 5, while the casting process may continue for other components through other discharge nozzles in the multiple casting head.

Figure 2:
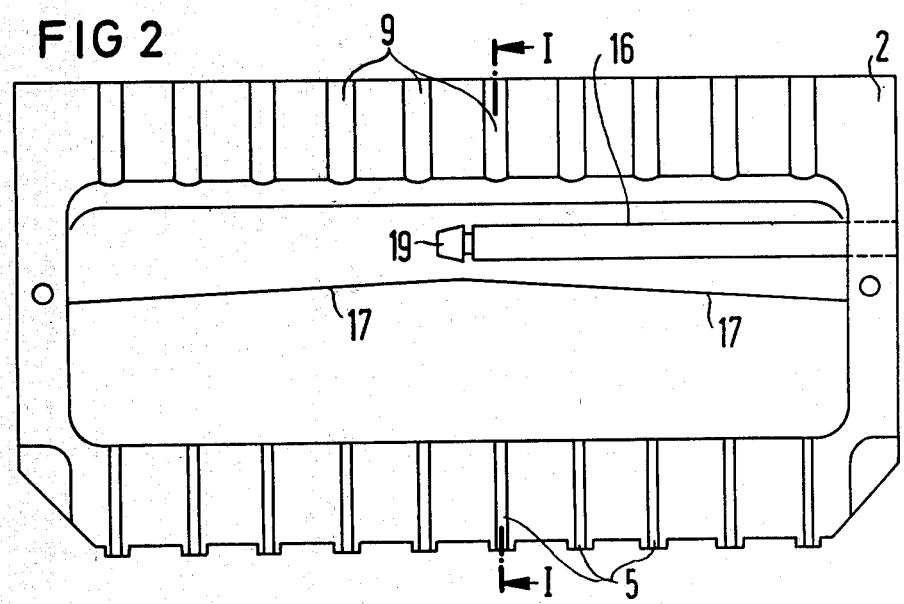
FIG. 2 is a view of one open half of the casting head shown in FIG. 1 taken along line II—II.

The supply of casting compound to the feed chamber 3 is undertaken via a casting tube 16. As best seen in FIG. 2, the casting tube 16 opens into a distributor barrier 17 where the casting compound is distributed along the discharge nozzles 5 and then flows downward to the nozzles 5 over the raised edge 18 of the barrier 17. The casting tube 16 extends approximately into the center of the casting head, which allows the casting compound to be distributed from a filling opening 19 of the tube 16 approximately uniformly over the entire distributor barrier 17 to all discharge nozzles. The distributor barrier 17 is also provided with a falling gradient from the central area of the filling opening 19 toward the edges of the chamber 3 where the outermost discharge nozzles 5 are disposed, so that even viscous casting compound can reach those remote discharge nozzles.

The two halves 1 and 2 of the casting head housing are held together by a clamping jaw 20 and a contact jaw 21, so that a seal is unnecessary between the two halves 1 and 2. One of the jaws 20 or 21, such as the contact jaw 21, is preferably heatable by heating elements 22 mounted therein so that the casting compound can be continuously maintained at a pre-determined temperature, thus insuring that the compound can be processed with a uniform viscosity.

A side view of the open casting head half 2 is shown in FIG. 2 showing ten discharge nozzles 5. A valve guide 9 is disposed above each discharge nozzle 5 for receiving individual valve tappets 8, which are not shown in FIG. 2.

Although modifications and changes may be suggested by those skilled in the art, it is the intention of the inventors to embody within the patent warranted hereon, all changes and modifications as reasonably and properly come within the scope of their contribution to the art.

We claim as our invention:

1. A multiple casting head comprising:
   a housing consisting solely of two separable halves divided by a vertical plane;
   a means for maintaining said separable halves of said housing in fluid-tight adjacent relation;
   a feed chamber in said housing;
   a means for introducing casting compound into said feed chamber;
   a plurality of discharge nozzles disposed in a row in said housing in communication with said feed chamber;
   a means for introducing compressed air into said feed chamber for discharging said casting compound;
   a plurality of valves individually movable to respectively open and close said discharge nozzles said valves and said discharge nozzles being divided by said plane such that when said halves of said housing are separated said valves and the interiors of said discharge nozzles are accessible for cleaning; and
   a means associated with each said valve for individually controlling said valve for precisely supplying selected differing amounts of said casting compound to respective containers disposed beneath said discharge nozzles.

2. The multiple casting head of claim 1 wherein each said valve has a valve tappet and wherein said means for individually controlling said valves is a pivoted lever for each valve engageable with said valve tappet.

3. The multiple casting head of claim 1 wherein said means for introducing said casting compound into said feed chamber terminates in a filling opening disposed above a distributor barrier, said distributor barrier disposed above and extending substantially parallel to said discharge nozzles.

4. The multiple casting head of claim 3 wherein said distributor barrier has a decreasing gradient extending from a central portion thereof to the outermost edges of said feed chamber along said row of discharge nozzles.

5. The multiple casting head of claim 3 wherein said distributor barrier has an upwardly curved edge extending above and substantially parallel to said row of discharge nozzles for preventing flow of said casting compound from said distributor barrier to said discharge nozzles until said distributor barrier is substantially uniformly fitted with said casting compound from said filling opening.

6. The multiple casting head of claim 1 wherein said means for introducing said casting compound into said feed chamber is a casting tube extending into said feed chamber and terminating in a filling opening which is disposed approximately at a center of said row of discharge nozzles.

7. The multiple casting head of claim 1 further comprising a means for heating at least one of said means for maintaining said separable halves of said housing in fluid-tight adjacent relation, for maintaining said casting compound at a pre-selected uniform viscosity.

* * * * *